(12) United States Patent
Matsuzaki et al.

(10) Patent No.: US 9,187,233 B2
(45) Date of Patent: *Nov. 17, 2015

(54) BRIGHTENING INK COMPOSITION FOR PRINTING, PAPER CONTAINER MATERIAL USING THE BRIGHTENING INK COMPOSITION, AND HEAT INSULATING FOAMED PAPER CONTAINER

(75) Inventors: Manabu Matsuzaki, Ritto (JP); Hiroshi Tsukawaki, Tokyo (JP); Mitsuaki Hirata, Tokyo (JP); Shinya Sugiura, Tokyo (JP); Hiroyuki Kawashima, Tokyo (JP)

(73) Assignees: NISSIN FOODS HOLDINGS CO., LTD., Osaka-shi (JP); Toyo Ink Mfg. Co., Ltd., Tokyo (JP)

( * ) Notice: Subject to any disclaimer, the term of this patent is extended or adjusted under 35 U.S.C. 154(b) by 290 days.

This patent is subject to a terminal disclaimer.

(21) Appl. No.: 12/935,713

(22) PCT Filed: Mar. 30, 2009

(86) PCT No.: PCT/JP2009/056513
§ 371 (c)(1),
(2), (4) Date: Dec. 20, 2010

(87) PCT Pub. No.: WO2009/123124
PCT Pub. Date: Oct. 8, 2009

(65) Prior Publication Data
US 2011/0111150 A1    May 12, 2011

(30) Foreign Application Priority Data

Mar. 31, 2008  (JP) ................. 2008-092239

(51) Int. Cl.
*B29D 22/00* (2006.01)
*B65D 81/38* (2006.01)
(Continued)

(52) U.S. Cl.
CPC .......... *B65D 81/3874* (2013.01); *C09D 11/037* (2013.01); *C09D 11/102* (2013.01); *Y10T 428/1303* (2015.01); *Y10T 428/24934* (2015.01)

(58) Field of Classification Search
CPC ............. B65D 81/3874; C09D 11/037; C09D 11/102; Y10T 428/1303; Y10T 428/24934
USPC ........................................................ 428/34.2
See application file for complete search history.

(56) References Cited

U.S. PATENT DOCUMENTS 5,490,631 A    2/1996    Iioka et al.
5,766,709 A    6/1998    Geddes et al.
(Continued)

FOREIGN PATENT DOCUMENTS

CN     1513924 A       7/2004
EP     0 765 821 B1    2/2000
(Continued)

OTHER PUBLICATIONS

Machine Translation of JP 2004-323731 A; 2004.*
(Continued)

*Primary Examiner* — James Yager
(74) *Attorney, Agent, or Firm* — Oblon, McClelland, Maier & Neustadt, L.L.P.

(57) ABSTRACT

There is provided a brightening ink composition for printing intended for realizing a heat insulating foamed paper container produced by foaming a low-melting point film by a heat treatment, such as a heat insulating foamed paper cup, the brightening ink composition conforming to the foaming without the occurrence of ink splits (cracks) upon foaming, having very small differences in level between the brightening printed areas and other printed areas at the container surface after foaming, making the container surface almost smooth, and having excellent design applicability and aesthetic properties as well as excellent heat resistance and print quality. A brightening ink composition containing a brightening material that imparts a sense of brightness, silicon dioxide, a binder resin and a solvent is prepared, and the brightening ink composition is used to form a printed layer of a paper container material for producing a heat insulating foamed paper container.

5 Claims, 2 Drawing Sheets

(51) Int. Cl.
*C09D 11/037* (2014.01)
*C09D 11/102* (2014.01)

(56) References Cited

U.S. PATENT DOCUMENTS

| | | | |
|---|---|---|---|
| 5,840,139 | A | 11/1998 | Geddes et al. |
| 6,030,476 | A | 2/2000 | Geddes et al. |
| 6,319,590 | B1 | 11/2001 | Geddes et al. |
| 2002/0007768 | A1 | 1/2002 | Yoshimura et al. |
| 2002/0030296 | A1 | 3/2002 | Geddes et al. |
| 2003/0104195 | A1 | 6/2003 | Geddes et al. |
| 2007/0240616 | A1* | 10/2007 | Nagano et al. ............ 106/404 |

FOREIGN PATENT DOCUMENTS

| | | | |
|---|---|---|---|
| EP | 1 186 638 B1 | | 6/2006 |
| JP | 7-232774 | | 9/1995 |
| JP | 7 232774 | | 9/1995 |
| JP | 9 95368 | | 4/1997 |
| JP | 9-95368 | | 4/1997 |
| JP | 11 189279 | | 7/1999 |
| JP | 2001-146221 | | 5/2001 |
| JP | 2002 105373 | | 4/2002 |
| JP | 2002-114934 | | 4/2002 |
| JP | 3414978 | | 6/2003 |
| JP | 2004 323731 | | 11/2004 |
| JP | 2004323731 A | * | 11/2004 |
| JP | 2004 346197 | | 12/2004 |
| JP | 2005-36079 | | 2/2005 |
| JP | 2006 168080 | | 6/2006 |
| JP | 2006 168770 | | 6/2006 |
| JP | 2006168770 A | * | 6/2006 |
| JP | 2006 218708 | | 8/2006 |
| JP | 2007056191 A | * | 3/2007 |

OTHER PUBLICATIONS

Machine Translation of JP 2006168770 A.*
Machine Translation of JP 2004323731 A.*
Machine Translation of JP 2007056191 A.*
"Polyurethane"; Hawley's Condensed Chemical Dictionary Twelfth Edition; 1993; p. 942.*
U.S. Appl. No. 12/935,115, filed Sep. 28, 2010, Matsuzaki, et al.
Office Action issued Sep. 28, 2010, in Japanese Patent Application No. 2010-505903 with partial English language translation.
International Preliminary Report on Patentability and Written Opinion issued Dec. 13, 2010 in PCT/JP2009/056513, filed on Mar. 30, 2009.
International Search Report issued Jun. 23, 2009 in PCT/JP09/056513 filed Mar. 30, 2009.
Chinese Office Action issued Dec. 4, 2012, in China Patent Application No. 2009801117486 (with English translation).
Office Action dated Jul. 12, 2013 issued in corresponding Chinese patent application No. 2009801117486.
Chinese Office Action issued Feb. 12, 2014, in China Patent Application No. 200980111748.6 (with English Translation).
Office Action issued Apr. 27, 2015 in Chinese Patent Application No. 200980111748.6 (with English translation).

* cited by examiner

BRIGHTENING INK COMPOSITION FOR PRINTING, PAPER CONTAINER MATERIAL USING THE BRIGHTENING INK COMPOSITION, AND HEAT INSULATING FOAMED PAPER CONTAINER

CROSS-REFERENCE TO RELATED APPLICATIONS

This application is a National Stage of PCT/JP2009/056513 filed Mar. 30, 2009. This application is based upon and claims the benefit of priority to Japanese Patent Application No. 2008-092239 filed Mar. 31, 2008, the subject matter of which has been incorporated into the present application by reference.

BACKGROUND OF THE INVENTION

1. Technical Field

The present invention relates to a brightening ink composition for forming, by gravure printing, a printed layer which imparts design applicability and aesthetic properties to the surface of a heat insulating foamed container, a paper container material using the ink composition, and a heat insulating foamed paper container. More particularly, the present invention relates to a brightening ink composition for forming a printed layer which has excellent foaming adaptability, has less surface unevenness, and provides a smooth surface with suppressed occurrence of cracks in the ink film, on the film of a paper container material having a thermoplastic synthetic resin film that is foamed by a heat treatment carried out upon the production of a heat insulating foamed paper container and thereby forms a heat insulating layer; a paper container material using the ink composition; and a heat insulating foamed paper container. The heat insulating foamed paper container having a printed layer that is formed from the brightening ink composition of the present invention has a smooth surface and exhibits excellent heat insulating properties, and therefore, the container can be suitably used as a container for holding food containing a high-temperature liquid or low-temperature liquid. For example, the heat insulating foamed paper container according to the present invention can be suitably used as a container such as a cup or a bowl for foods including soup, sweet red bean soup, miso soup and noodles.

2. Background Art

In recent years, the demands for ink and the printing industry are extending into a broad range of applications, concomitantly with the varietization of packaging containers. For example, in the field of containers such as the cups used for those food products generally called as "cup noodles," including ramen products, udon and soba noodles, which become edible several minutes after an appropriate amount of boiling water is poured into the container, polystyrene cups have been mainly used from the viewpoint of cost and heat insulating properties.

However, in the case of foamed polystyrene cups, printing on the cups must be performed individually after the forming of cups. Accordingly, the printing method is limited to methods of using a curved surface printing machine or a stamp printing machine, and there has been a problem that the printing speed and the print quality are poor. Furthermore, owing to the reasons such as that the polystyrene price is increasing concomitantly with a recent increase in the price of petroleum, and that under the implementation of the Containers and Packaging Recycling Law, the food product manufacturers are responsible for the recycling fee, transition from polystyrene cups to paper cups is being promoted in recent years.

As one of the representative structures of paper containers, there is known a double-walled cup having a heat insulating air layer which is formed by bonding paper and paper with furrows therebetween. However, the double-walled cup has problems in terms of high weight and high price. Therefore, heat insulating foamed paper containers are attracting more attention these years.

A heat insulating foamed paper container is generally produced using a paper container material having a thermoplastic synthetic resin film that is foamed by a heat treatment carried out upon production of the container and forms a heat insulating layer. More specifically, the paper container material has a structure in which, for example, a high melting point polyethylene film having a melting point of about 130° C. to 135° C. is laminated on one surface of a base paper (inner side of container), and a low melting point polyethylene film having a melting point of about 105° C. to 110° C. (hereinafter, referred to as "low-Mp film") is laminated on the other surface of the base paper (outer side of container), and a printed layer containing print patterns such as decorative patterns, the company name and a barcode is formed on the surface of the low-Mp film.

In the production process for the heat insulating foamed paper container, a paper container material having a print layer formed in advance is punched out into a predetermined shape, this is used as a body member of cup to form a cup, and then the cup is subjected to a heat treatment at near the melting point of the tow-Mp film, thereby the low-Mp film being foamed. Foaming occurs when the moisture contained in the base paper evaporates at the time of the heat treatment and is pushed out to the side of the low-Mp film which has been softened, and thereby the low-Mp film expands toward the outer side. The low-Mp film thus foamed functions as a heat insulating layer and imparts heat insulating properties to the paper container. Such a heat insulating foamed paper container is disclosed in, for example, Japanese Patent Application Laid-Open (JP-A) No. H9-95368 (Patent Document 1), JP-A No. H7-232774 (Patent Document 2), and JP-A No. H11-189279 (Patent Document 3).

The formation of a printed layer on the surface of the low-Mp film of the material for heat insulating foamed paper containers is usually carried out according to a surface printing method based on gravure printing. In the field of surface printing based on gravure printing, ink is applied on the surface of objects to be printed, such as various base papers and plastic packaging containers. Therefore, inks for gravure printing are requested to have printing suitability for objects to be printed, as well as adhesiveness to the base papers and plastic materials, and various resistances such as the resistance to blocking to prevent adhesion between printed matters after printing, and the abrasion resistance and heat resistance required upon the formation of container.

Furthermore, an ink for gravure printing usually contains an aromatic solvent such as toluene as a main solvent, so as to achieve a balance between the solubility of binder resins and the dryability. However, recently, the tendency toward using a printing ink that does not contain an aromatic solvent is growing stronger, in order to improve the environment of the printing worksite.

Moreover, when the product value as a heat insulating foamed paper container is considered, the ink for gravure printing for forming a printed layer of the container is desirably such that the ink film does not impede but promotes foaming of the low-Mp film that constitutes the heat insulating layer and can thereby provide a container surface having less surface unevenness, and that the ink film has less occurrence of cracks and can provide a smooth printed surface.

As the ink for gravure printing for forming printed layers of heat insulating foamed paper containers, there have been traditionally known inks containing polyamide resins and cellulose derivatives as binder components. However, in the case of an ink containing a polyamide resin as a main component of the binder components, when the ink film is exposed to heat or light over a long time, the low molecular weight components such as oils and fats contained in the polyamide resin undergo oxidative degradation into acetaldehydes, thereby causing a problem of generating a fat-based odor. Furthermore, since there is a possibility that the content in the container may cause a change in the taste due to the generated fat-based odor, this poses a serious problem.

Furthermore, when the printing ink described above is prepared as a brightening ink containing a brightening material such as an aluminum material, and is used to form a printed layer, the ink film tends to markedly suppress the foaming of the low-Mp film. Therefore, when a printed layer formed from a brightening ink has been directly provided on the low-Mp film, conspicuous surface unevenness occurs between the printed areas and the non-printed areas, and thus it is difficult to obtain a smooth printed surface. Accordingly, in the case of forming a printed layer using a brightening ink, usually an undercoat layer of a white ink is provided on the low-Mp film. However, brightening inks have a large suppressive power against the foaming of the low-Mp film as compared with white inks. Thus, even when a white ink is printed as an undercoat layer and a brightening ink is overprinted thereon, it is difficult to make uniform of the thickness of the low-Mp film after foaming.

The surface of a container having such a printed layer is such that the printed areas of white ink/brightening ink overprinting are obviously depressed as compared with the printed areas of white ink, and clear differences in level occur. Therefore, the heat insulating foamed paper container does not acquire a smooth feeling of touch, and have problems such as impaired merchantability or unreadable barcodes. Furthermore, since the foaming of the low-Mp film is suppressed, a heat insulating layer having a sufficient thickness is not obtained, and there are also problems in terms of heat insulating properties, such as the container becomes hot when hot water is placed in the container.

On the other hand, JP-A No. 2006-218708 (Patent Document 4) discloses a colored ink which is applicable to gravure printing, has a sense of glitter, and is excellent in high glossiness and design applicability. The disclosed colored ink contains a pearl pigment and silica as brightening materials, and is mainly used for forming an undercoat layer of glossy decorative papers that are applied to the interior design materials of construction materials and the like.

Patent Document 1: JP-A No. H9-95368
Patent Document 2: JP-A No. H7-232774
Patent Document 3: JP-A No. H11-189279
Patent Document 4: JP-A No. 2006-218708

DISCLOSURE OF INVENTION

In order to improve the surface unevenness of the printed layer in a heat insulating foamed paper container, Patent Document 3 suggests a technology of forming, on the surface of the low-Mp film, an undercoat layer using an ink that does not inhibit but can synchronize in the foaming of the low-Mp film. However, even when a printed layer is formed using a brightening ink on such an undercoat layer, surface unevenness still occurs, and various properties such as the feeling of touch, design applicability and heat insulating properties are not satisfactory. Thus, new improvements are desired. Furthermore, Patent Document 4 discloses a colored ink containing a brightening material, but the document does not suggest any descriptions on a technology of providing a heat insulating foamed paper container having a printed layer with less surface unevenness, by using the colored ink. However, as described in the above, since an ink containing a brightening material has a large suppressive power against the foaming of low-Mp films, there is a high possibility that surface unevenness would occur at the printed surface even in a printed layer formed from the colored ink. Accordingly, a brightening ink having excellent foaming adaptability, which can be suitably used for the particular application of heat insulating foamed paper containers, is needed.

Therefore, the present invention is purported to address the items listed below, in order to solve the problems posed heretofore in the field of printing inks intended for heat insulating foamed paper containers.

An object of the present invention is to provide a brightening ink composition intended for a brightening ink for forming a printed layer of a heat insulating foamed paper container, which ink composition exhibits excellent foaming adaptability for the foaming of the low-Mp film as a result of a heat treatment upon the production of a container, and has less occurrence of cracks in the ink film. The term "excellent foaming adaptability" as used herein means that the smooth ink film of the printed layer formed on the surface of a low-Mp film which is foamed by a heat treatment, does not significantly impede the foaming of the film and indicates following performance to the foaming, whereby and the heat insulating layer which is formed by uniform expansion of the film, is maintained in a state of having surface unevenness at the surface to a minimum.

Another object of the present invention is to provide a brightening ink composition which has heat resistance and light fastness in addition to the properties described above, forms an ink film that does not generate foul odor even when exposed to heat or light over a long Lime, and is excellent in abrasion resistance, anti-blocking property and adhesiveness to a low-Mp film that serves as a base material.

Another object of the present invention is to provide a brightening ink composition which does not use an aromatic solvent and is excellent in the various properties described above.

Another object of the present invention is to provide a heat insulating foamed paper container material having a printed layer formed from the brightening ink composition which is excellent in various properties, on a low-Mp film which is foamed by a heat treatment and forms a heat insulating layer.

Another object of the present invention is to provide a heat insulating foamed paper container having less surface unevenness at the container surface and having a smooth printed layer surface, that is, having a smooth surface and excellent external appearance, by using the container material mentioned above having a printed layer formed from the brightening ink composition excellent in various properties.

In order to solve the problems from the past in the printed layer of heat insulating foamed paper containers, the inventors of the present invention have made a thorough investigation on brightening inks. As a result, the inventors have found that when a printed layer is formed using a brightening ink composition containing silicon dioxide and a brightening material such as an aluminum material, the ink film exhibits excellent adaptability for the foaming of the low-Mp film, and the occurrence of ink splits (cracks) in the ink film is suppressed. That is, the inventors have found that by using the brightening ink composition, the differences in level between the areas printed with the brightening ink and the other printed areas in the surface of a heat insulating foamed paper container obtained by a heat treatment can be effectively reduced, and thereby a heat insulating foamed paper container having excellent printing quality in terms of smoothness, design applicability and aesthetic properties and also having excellent heat insulating properties, can be realized. The present invention is based on such findings as described above, and relates to the following items.

A first aspect of the present invention relates to a brightening ink composition for forming a printed layer to a heat insulating foamed paper container material which has abase paper; a first thermoplastic synthetic resin film that covers one surface of the base paper; and a second thermoplastic synthetic resin film that covers the other surface of the base material, has a lower melting point than the first thermoplastic synthetic resin film, and is foamed by a heat treatment to form a heat insulating layer, wherein the printed layer is formed on the surface of the second thermoplastic synthetic resin film, and the ink composition contains a brightening material, silicon dioxide, a binder resin and a solvent. The brightening ink composition preferably contains a colorant according to necessity.

Here, the brightening material is preferably one or two or more materials selected from an aluminum material, a pearl pigment and a glass material. Furthermore, the solids content of the brightening material is preferably 2 to 30% by weight relative to the total weight of the brightening ink composition. The aluminum material is preferably a non-leafing type aluminum paste which has a particle size of 5 to 40 μm and has been surface treated with fatty acids.

The silicon dioxide has a particle size of 2 to 20 μm, and the content of the silicon dioxide is preferably 0.2 to 5% by weight relative to the total weight of the brightening ink composition.

The binder resin is preferably a component containing a polyurethane resin and a vinyl-based polymer. Furthermore, the mixing ratio of the polyurethane resin:vinyl-based polymer in the component is preferably 95:5 to 5:95 in terms of the solids content weight.

A second aspect of the present invention relates to a heat insulating foamed paper container material including a base paper; a first thermoplastic synthetic resin film that covers one surface of the base paper; a second thermoplastic synthetic resin film that covers the other surface of the base paper, has a lower melting point than the first thermoplastic synthetic resin film, and is foamed by a heat treatment to form a heat insulating layer; and a printed layer provided on at least a part of the surface of the second thermoplastic synthetic resin film, wherein the printed layer contains at least one print pattern formed from the brightening ink composition of the first aspect of the present invention.

A third aspect of the present invent ion relates to a heat insulating foamed paper container obtained by joining a container body member formed from the heat insulating foamed paper container material which is the second aspect of the present invention, with a bottom plate member such that the first thermoplastic synthetic resin film of the paper container material forms the inner wall surface and the second thermoplastic synthetic resin film forms the outer wall surface, thereby forming a container, and foaming the second thermoplastic synthetic resin film by heat treating the container.

The present application claims priority based on Japanese Patent Application No. 2008-092239 filed by the same Applicant on Mar. 31, 2008, the subject matter of which has been incorporated into the present application by reference.

According to the present invention, there can be provided a brightening ink composition which improves the problems of the past in the printed layer of heat insulating foamed paper containers, realizes a heat insulating foamed paper container having a smooth surface and excellent external appearance, and is excellent in various resistances required of an ink and in the printing quality. Furthermore, when such an ink composition is used, there can be provided a heat insulating foamed paper container which has less surface unevenness and a smooth printed surface, that is, a smooth and flat surface, even when the printed layer is constituted to have a brightening ink overprinted on a white ink, and which is excellent in design applicability, aesthetic properties and heat resistance.

EXPLANATIONS OF REFERENCE NUMERALS

Figure 1:
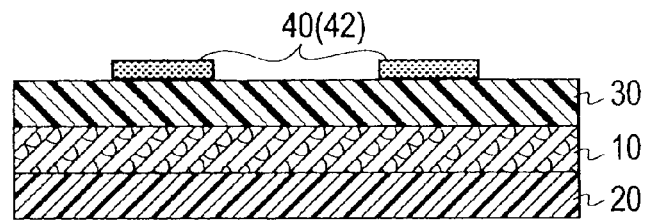
FIG. 1 is a schematic cross-sectional view showing an embodiment of the paper container material according to the present invention.

10 BASE PAPER
20 FIRST THERMOPLASTIC SYNTHETIC RESIN FILM (HIGH-MP RESIN FILM)
30 SECOND THERMOPLASTIC SYNTHETIC RESIN FILM (LOW-MP RESIN FILM)
30' HEAT INSULATING LAYER (SECOND THERMOPLASTIC SYNTHETIC RESIN FILM AFTER FOAMING)
40 PRINTED LAYER
42 PRINT PATTERN
42A FIRST PRINT SECTION
42B SECOND PRINT SECTION
44 UNDERCOAT LAYER
50 CONTAINER BODY
50A INNER WALL SURFACE OF CONTAINER
50B OUTER WALL SURFACE OF CONTAINER
60 BOTTOM PLATE OF CONTAINER

BEST MODE FOR CARRYING OUT THE INVENTION

Hereinafter, the present invention will be explained in detail.

(Brightening Ink Composition)

The brightening ink composition according to the present invention is a brightening ink composition for forming, by gravure printing, a printed layer on the surface of the second thermoplastic synthetic resin film carried by a heat insulating foamed paper container material, which has a base paper; a first thermoplastic synthetic resin film that covers one surface of the base paper; and a second thermoplastic synthetic resin film that covers the other surface of the base paper, has a lower melting point than the first thermoplastic synthetic resin film, and is foamed by a heat treatment to form a heat insulating layer, and the ink composition is characterized in that the composition contains a brightening material, silicon dioxide, a binder resin, a solvent, and if necessary, a colorant. In the following descriptions, the first thermoplastic synthetic resin film will be simply referred to as "high-Mp resin film" and the second thermoplastic synthetic resin film as "low-Mp resin film."

The brightening material used in the brightening ink composition of the present invention is desirably a material which imparts, for example, a sense of brightness of metallic tone to the ink film, and is capable of increasing the design applicability and aesthetic properties of the product as a whole through the sense of vision. In general, the sense of brightness of the ink film is one of the chromatic sensations imparted, through the sense of vision, by the color tone intrinsic to the brightening material, as well as a structural factor involving the arrangement and orientation of the brightening material within the ink film or near the ink film surface, together with a surface factor originating from the smoothness at the ink film surface, and the like.

According to the present invention, in order to impart a preferable sense of brightness to the ink film by using the brightening material, it is necessary to optimize the nature of the brightening material, for example, the surface treatment method, particle size or the concentration used. Furthermore, when an application to heat insulating foamed paper containers is considered, an ink film containing the brightening material must not be a factor that significantly inhibits the foaming of film upon the foaming of the low-Mp resin film.

Examples of the brightening material that can be used in the present invention include an aluminum material, a pearl pigment, and a glass material. In the present invention, these brightening materials can be used singly or in combination of two or more kinds.

Specific examples of the aluminum material include an aluminum powder, an aluminum paste and aluminum flakes. The aluminum powder is a metallic pigment that does not contain a solvent component, and also includes a type of material obtained by coating aluminum particles with a resin such as an acrylic resin. Furthermore, the aluminum paste is a material obtained by surface treating scale-like fine particles of aluminum, and making the fine particles into a paste using an organic solvent or the like. An example of the aluminum flakes may be a type of material obtained by pigmentizing an aluminum deposition film.

An example of the pearl pigment may be a white pearl obtained by preparing a fine powder of mica and subjecting the fine powder to a surface treatment. Furthermore, examples of the glass material include scale-like glass flakes, and a material of glossy pigment type obtained by further coating the scale-like glass flakes with a metal or a metal oxide.

The brightening material used in the brightening ink composition of the present invention is not particularly limited, but is preferably an aluminum material. When the dispersibility and stability in the brightening ink composition are considered, an aluminum paste is most preferred.

The aluminum paste is generally prepared by crushing an aluminum material into a flake form (scale form) by means of a ball mill or another pulverizer, while surface treating the aluminum material with fatty acids. Depending on the type of the fatty acids used upon the production, the aluminum material is largely classified into two types such as a leafing type and a non-leafing type.

These two types differ in the arrangement of aluminum particles in the ink coating layer at the time of printing, due to the difference in the surface treating agent.

More specifically, the leafing type uses stearic acid as a surface treating agent. Since this stearic acid works as an oleophobic film, the aluminum particles have a property of floating up from the intermediate layer of the ink coating layer to the surface, owing to the surface tension.

On the contrary, the non-leafing type uses oleic acid as a surface treating agent. This oleic acid is less effective in lowering the surface tension as compared with stearic acid. Accordingly, after printing, aluminum particles are arranged in parallel mainly in the middle of the ink coating layer, and therefore, the ink coating film shows a glittering external appearance of metallic tone.

When a brightening ink is prepared using a leafing type aluminum paste, the ink film exhibits excellent foaming adaptability. However, the ink film tends to be somehow poorer in the abrasion resistance and adhesiveness, as compared with the case of using a non-leafing type aluminum paste. For that reason, it is preferable to use a non-leafing type aluminum paste as a brightening material in an embodiment of the present invention.

The non-leafing type aluminum paste used in the present invention is preferably a product obtained by treating the surface of aluminum particles with oleic acid, and having a particle size after treatment in the range of 5 to 40 μm. The particle size is more preferably in the range of 8 to 25 μm. If the particle size is 5 μm or less, the viscosity of the obtained brightening ink increases, and the ink condition tends to become poor. On the other hand, if the particle size is 40 μm or larger, the concealability of the ink coating film tends to be lowered.

The aluminum particles in the aluminum paste generally have a scale-like shape, and the shape is represented by the particle size and the thickness. The particle size is an average particle size on the side of a larger surface of the particle, and the average particle size is measured by a particle size distribution analyzer based on light scattering, or by direct observation with an electron microscope. According to the present invention, the D50 value of the particle size (size of 50 cumulative weight percent of the particles) measured according to a light scattering method was designated as the average particle size.

The solids content of the aluminum paste in the brightening ink composition of the present invention is preferably 2 to 30% by weight relative to the total weight of the brightening ink composition. The solids content is more preferably in the range of 5 to 20% by weight. If the solids content is 2% by weight or less, the concealing power and sense of brightness of the ink film tend to be lowered, and the foaming adaptability also tends to be decreased. On the other hand, if the solids content is 30% by weight or more, the viscosity of the brightening ink increases, and the ink fluidity tends to be decreased.

In the brightening ink composition of the present invention, other brightening materials may also be used in place of the aluminum paste. However, when a pearl pigment is used, the foaming adaptability tends to be slightly deteriorated as compared with the case of using a non-leafing type aluminum paste. Furthermore, when aluminum flakes or glass flakes are used, excellent foaming adaptability may be obtained, but since these flakes are very expensive, using them in the application intended in the present invention is inappropriate in terms of cost.

The silicon dioxide that can be used in the present invention may be, for example, a compound known as "synthetic silica" produced by an already known method. Representative production methods for synthetic silica include a wet method of producing an ultrafine powder of hydrated silicic acid by allowing a sodium silicate based on high purity silica sand as a raw material, to react with an acid; and a dry method of subjecting silicon tetrachloride to combustion hydrolysis in the gas phase.

The silicon dioxide used in the present invention is not particularly limited according to the synthesis method. For example, any of a silicon wax, a treated silica produced by surface modifying an organosilicon compound with a treating agent, and untreated silicon dioxide (untreated silica) is acceptable. The particle size of the silicon dioxide used in the present invention is preferably in the range of 2 to 20 μm. When a silicon dioxide having a particle size of 2 μm or less is used, there is a tendency that the viscosity of the obtained ink composition increases, and the condition of the ink is made poor. On the other hand, when a silicon dioxide having a particle size of 20 μm or greater is used, the foaming adaptability of the ink film against the foaming of a low melting point resin film at the time of heat treatment during the production of a container tends to be deteriorated. According to the present invention, more preferably, a silicon dioxide having a particle size in the range of 3 to 10 μm is used.

The particle size of silicon dioxide is generally measured by a Coulter counter method utilizing a change in electrical resistance, a laser method utilizing light scattering, or the like. According to the present invention, the particle size means an average particle size that is obtained by the measurement utilizing a laser method.

The content of silicon dioxide in the brightening ink composition of the present invention is preferably adjusted in the range of 0.2 to 5% by weight relative to the total mass of the ink composition. If the content of silicon dioxide is 0.2% by weight or less, there is a tendency that a sufficient effect of improving the foaming adaptability of the ink film is not obtained. If the content is 5% by weight or more, there is a tendency that the viscosity of the ink increases, and the condition of ink is made poor. Furthermore, the abrasion resistance tends to decrease. The content is more preferably adjusted in the range of 0.5 to 3.5% by weight in view of the condition of ink and the foaming adaptability.

Usually, in the case of a colored ink containing a brightening material or a chromatic pigment, the adaptability to the foaming of the low-Mp resin film is insufficient, and the printed areas at the container surface after foaming are depressed more than other printed areas, so that there occurs a difference in level. Particularly, in the case of a brightening ink containing a brightening material, the differences in level at the printed surface are large, and the external appearance of the container are markedly damaged thereby. However, according to the present invention, when a brightening material for imparting the sense of brightness and silicon dioxide are simultaneously used, the foaming adaptability of the ink film is improved, so that it is made possible to effectively suppress the formation of surface unevenness in the printed surfaces of the printed areas containing the brightening material.

Furthermore, according to the present invention, when the brightening material and silicon dioxide are used together, the occurrence of ink splits (cracks) in the ink film of the printed layer upon the foaming of the low-Mp resin film is suppressed, and thus the foaming adaptability is improved, while it is made possible to provide a smooth printed surface.

Usually, when silicon dioxide is added into an ink composition, the ink film is deglossed and is imparted a matt feeling, so that the sense of brightness is decreased. However, according to the brightening ink of the present invention, unlike the typically predicted effects of silicon dioxide, the ink film maintains the sense of brightness and can provide excellent design applicability and aesthetic properties. It is not intended to be bound by theory, but it is interpreted that in the present invention, the addition of silicon dioxide improves the adaptability to foaming while suppressing the occurrence of cracks in the ink film, and the uniformity and isotropy of the ink film are maintained.

In regard to the binder resin used in the present invention, any resin that is conventionally well known as a binder resin for printing inks can be used. Examples of such a resin include a urethane resin, a vinyl-based copolymer, a soluble nitrocellulose, a chlorinated polyolefin resin, an alkyd resin, a rosin resin and nitrocellulose.

Among the resins described above, it is preferable to use, but not intended to be limited to, at least a urethane resin from the viewpoint of the foaming adaptability of the ink upon foaming and the sensory odor, and under consideration of the various resistances of the ink such as light fastness, heat resistance, abrasion resistance and anti-blocking property, and of the adhesiveness to the low-Mp resin film serving as a base material. When use is made of a urethane resin, or of a resin mixture containing a urethane resin as a main component as the binder resin, the foul odor generated from the printed areas provided on the body unit of a paper container such as a paper cup can be almost completely eliminated, even after a storage in an environment exposed to heat or light over a long time. Furthermore, satisfactory results may be obtained for various properties of the ink film, including the abrasion resistance, anti-blocking property and adhesiveness to the low-Mp resin film serving as a base material.

The term "urethane resin" used in the present invention means a broad range of urethane resins, including the general urethane resins conventionally used in the pertinent technical field, and modified urethane resins including urethane-urea resins and the like. Furthermore, the urethane resin used according to the present invention is not particularly limited according to the production method, and various urethane resins obtained by applying a method that is publicly known or widely known in connection with urethane resins, are acceptable. According to the present invention, a preferred embodiment of the urethane resin may include, but not intended to be limited to, a urethane resin obtained by reacting a polyol compound and an organic diisocyanate. Another embodiment may include a modified urethane resin obtained by modifying a prepolymer of a urethane resin with an amine compound or an amide compound. These urethane resins will be respectively explained below.

Specific examples of the polyol compound that can be used in the production of the urethane resin include the various known polyols shown below.

(1) Polyether polyols, such as polymers or copolymers of ethylene oxide, propylene oxide and tetrahydrofuran;

(2) Polyester polyols obtained by dehydration condensation of saturated and unsaturated low molecular weight glycols such as ethylene glycol, 1,2-propanediol, 1,3-propanediol, 1,3-butanediol, 1,4-butanediol, neopentyl glycol, pentadiol, methylpentadiol, hexadiol, octanediol, nonanediol, methylnonanediol, diethylene glycol, triethylene glycol and dipropylene glycol, with alkyl glycidyl ethers such as n-butyl glycidyl ether and 2-ethylhexyl glycidyl ether, monocarboxylic acid glycidyl esters such as versatic acid glycidyl ester, and dibasic acids such as adipic acid, phthalic acid, isophthalic acid, terephthalic acid, maleic acid, fumaric acid, succinic acid, oxalic acid, malonic acid, glutaric acid, pimelic acid, azelaic acid, sebacic acid and dimer acid, or anhydrides thereof;

(3) Other polycarbonate diols, polybutadiene glycols, and glycols obtained by adding bisphenol A ethylene oxide or propylene oxide; and (4) Dimer dials. These various polyols may be used singly or in combination of two or more kinds.

According to the present invention, in the case of using the polyols listed in the item (2) above, the polyol may be substituted with various other polyols up to 5% by mole of the amount of incorporation of the glycol. That is, for example, the polyol may be substituted with a polyol such as glycerin, trimethylolpropane, trimethylolethane, 1,2,6-hexanetriol, 1,2,4-butanetriol or pentaerythritol.

The number average molecular weight of the polyol is appropriately determined by taking into consideration of the properties of the urethane resin obtained as a reaction product, such as solubility, dryability and anti-blocking property. The number average molecular weight is not particularly limited, but usually, the number average molecular weight is suitably in the range of 500 to 10,000, and more preferably in the range of 500 to 6,000. If the number average molecular weight is less than 500, the printing suitability tends to decrease, concomitantly with a decrease in solubility. Furthermore, if the number average molecular weight is greater than 10,000, the dryability and anti-blocking property tend to decrease.

On the other hand, the organic diisocyanate compound that can be used in the production of the urethane resin according to the present invention may be one of various known aromatic, aliphatic or alicyclic diisocyanates. Specific examples include 1,5-naphthylene diisocyanate, 4,4'-diphenylmethane diisocyanate, 4,4'-diphenyldimethylmethane diisocyanate, 4,4'-dibenzyl isocyanate, dialkyldiphenylmethane diisocyanate, tetraalkyldiphenylmethane diisocyanate, 1,3-phenylene diisocyanate, 1,4-phenylene diisocyanate, tolylene diisocyanate, butane-1,4-diisocyanate, hexamethylene diisocyanate, isopropylene diisocyanate, methylene diisocyanate, 2,2,4-trimethylhexamethylene diisocyanate, cyclohexane-1,4-diisocyanate, xylenediisocyanate, isophorone diisocyanate, lysine diisocyanate, dicyclohexylmethane-4,4'-diisocyanate, 1,3-bis(isocyanatomethyl)cyclohexane, methylcylcohexane diisocyanate, norbornane diisocyanate, m-tetramethylxylene diisocyanate, and a dimer diisocyanate obtained by substituting the carboxyl group of a dimer acid with an isocayanate group.

The method for producing the urethane resin may be a conventionally publicly known or widely known method, and is not particularly limited. For example, in the case of allowing a polyol compound to react with an organic diisocyanate, there is no limitation on the conditions, except that the organic diisocyanate is used in excess with respect to the polyol compound. In a preferred embodiment of the production of urethane resin according to the present invention, it is desirable to adjust the molar equivalent ratio of isocyanate group/hydroxyl group in the range of 1.2/1 to 3/1. If the molar equivalent ratio of isocyanate group/hydroxyl group is 1.2/1 or lower, the urethane resin thus obtained tends to become brittle. When a brittle urethane resin is used as a binder resin for printing inks, blocking is prone to occur. On the other hand, if the molar equivalent ratio of isocyanate group/hydroxyl group is 3/1 or higher, the viscosity increases during the production of a urethane resin, and gelation is prone to occur during the reaction. The polyurethanation reaction in the production of a urethane resin is usually carried out at a reaction temperature in the range of 80° C. to 200° C., and preferably in the range of 90° C. to 150° C.

The polyurethanation reaction may be carried out in a solvent, or may be carried out in a solvent-free atmosphere. In the case of using a solvent, a solvent can be appropriately selected from the solvents that will be listed below, from the viewpoint of controlling the reaction temperature, viscosity and side reactions. Furthermore, in the case of carrying out the polyurethanation reaction in a solvent-free atmosphere, it is desirable to carry out the reaction after decreasing the viscosity by increasing the temperature to the extent that sufficient stirring can be achieved, in order to obtain a uniform urethane resin. The reaction time for the polyurethanation reaction is desirably set at 10 minutes to 5 hours. The point of completion of the reaction can be determined by methods such as viscosity measurement, confirmation of the NCO peak by IR analysis, and measurement of the NCO % by titration.

An example of the modified urethane resin according to the present invention may be a polyurethane-urea resin. A suitable polyurethane-urea resin that can be used in the present invention is a resin obtained by reacting the polyol compound and organic diisocyanate listed above to synthesize a prepolymer of a urethane resin having isocyanate groups at the ends, and then introducing a urea bond into the prepolymer of the urethane resin by using an amine compound or an amide compound as a chain extending agent and a reaction terminating agent. In the present invention, various properties of the ink film can be further increased by using the polyurethane-urea resin mentioned above in particular, among the urethane resins.

Examples of the chain extending agent that can be used to introduce a urea bond include various known amines. Specific examples include ethylenediamine, propylenediamine, hexamethylenediamine, triethylenetetramine, diethylenetriamine, isophorone diamine, and dicyclohexylmethane-4,4'-diamine. Other examples include diamines having a hydroxyl group in the molecule such as 2-hydroxyethyl ethylenediamine, 2-hydroxyethyl propylenediamine, di-2-hydroxyethyl ethylenediamine, di-2-hydroxyethyl propylenediamine, 2-hydroxypropyl ethylenediamine, and di-2-hydroxypropyl ethylenediamine; and dimer diamines obtained by substituting the carboxyl group of a dimer acid with an amino group.

Examples of the compound that can be used as the reaction terminating agent according to the present invention include aliphatic amine compounds or fatty acid amide compounds, each having a long chain alkyl group having from 8 to 22 carbon atoms. Examples of the aliphatic amine compounds may include octylamine, laurylamine, coconut amine, myristylamine, stearylamine, oleylamine, palmitylamine and dibutylamine, and these can be used singly or as mixtures of two or more kinds. Examples of the fatty acid amide compounds include octanoic acid amide, decanoic acid amide, lauric acid amide, myristic acid amide, palmitic acid amide, stearic acid amide, behenic acid amide, oleic acid amide, erucic acid amide, linolic acid amide, and linoleic acid amide, and these can be used singly or as mixtures of two or more kinds.

When the aliphatic amine or aliphatic amide compound having a long chain alkyl group having from 8 to 22 carbon atoms is introduced into the ends of the prepolymer of the urethane resin, the anti-blocking property of the ink film can be enhanced. It is not intended to be bound by theory, but it is believed that since the long chain alkyl group exhibits surface-active properties, the long chain alkyl groups are oriented at the coating film surface in the course of film forming, thereby improving the anti-blocking property of the urethane resin. Although such a fatty acid amine or fatty acid amide is introduced into the urethane resin, inconveniences such as a decrease in the gloss of the coating film surface do not occur.

The production method for introducing a urea bond into a prepolymer of a urethane resin is not particularly limited. An example may be a two-stage method in which a polyol compound is reacted with an organic diisocyanate compound at a ratio in which the isocyanate groups are present in excess, thereby a prepolymer having isocyanate groups at the ends of the polyol is prepared, and then this prepolymer is reacted with a chain extending agent and a reaction terminating agent in a solvent. This two-stage method is preferable in view of more easily obtaining a uniform polymer solution. Although not particularly limited, when the number of free isocyanate groups present at both ends of the prepolymer is defined as 1, it is preferable to adjust the total number of the amino groups present in the chain extending agent and reaction terminating agent used, in the range of 0.5 to 1.3. If the total number of the amino groups is less than 0.5, there is a tendency that dryability, anti-blocking property and the effects of enhancing the coating film strength are not sufficiently obtained. On the other hand, if the total number of the amino groups is greater than 1.3, the chain extending agent and the reaction terminating agent may remain unreacted, and a foul odor tends to remain behind in the printed layer.

The solvent used in the production of the urethane resin and the production of the polyurethane-urea resin may be a widely known compound that can be usually used as a solvent for printing inks. Examples include alcohol-based solvents such as methanol, ethanol, isopropanol, n-propanol and n-butanol; ketone-based solvents such as acetone, methyl ethyl ketone, and methyl isobutyl ketone; ester-based solvents such as ethyl acetate, propyl acetate and butyl acetate; and non-aromatic hydrocarbon-based solvents such as methylcyclohexane and ethylcyclohexane. These solvents can be used singly or as mixtures of two or more kinds. In addition, when a ketone-based solvent such as mentioned above is used during the production, ketimine is produced between the ketone and the amine used as the chain extending agent, and this product inhibits smooth proceeding of the reaction. Therefore, in order to suppress the generation of ketimine and to allow smooth proceeding of the reaction, it is desirable to use a small amount of water together.

The number average molecular weight of the urethane resin used as the binder resin according to the present invention is preferably in the range of 5,000 to 100,000. When an ink composition for printing is prepared using a urethane resin having a number average molecular weight of less than 5,000, there is a tendency that the properties of the ink composition, such as the dryability, anti-blocking property, film strength and oil resistance, are prone to decrease. On the other hand, when a urethane resin having a number average molecular weight of greater than 100,000 is used, there is a tendency that the viscosity of the printing ink is increased, and the gloss of the printing ink film decreases.

According to an embodiment of the ink composition of the present invention, it is preferable to use another binder resin such as a vinyl-based copolymer and nitrocellulose in appropriate combination, in addition to the urethane resin explained above. When a urethane resin is used in combination with another resin, the external appearance of foaming tends to be enhanced, in addition to the improvement of various properties. It is not intended to be bound by theory, but it is believed that when components having elongation ratios that are different from that of the urethane resin are added, those components act as a kind of binding agent when the urethane component is expanded by a heat treatment and forms a foam layer.

The nitrocellulose that can be used in the present invention may be a well known nitrocellulose compound conventionally used in printing inks. On the other hand, as the vinyl-based copolymer, use can be made of a copolymer obtained by copolymerizing one of vinyl chloride monomers, fatty acid vinyl monomers and various vinyl monomers, with another polymerizable monomer having an unsaturated carbon-carbon double bond and if necessary, having a functional group, in one molecule. From the viewpoint of enhancing the external appearance of foaming, it is preferable to use a urethane resin and a vinyl-based copolymer in combination. Hereinafter, specific examples of the vinyl-based copolymer that can be used in the present invention will be described.

Examples of the fatty acid vinyl monomer that can be used as a monomer for producing the vinyl-based copolymer include vinyl acetate, vinyl propionate, vinyl monochlorate, vinyl versakate, vinyl laurate, vinyl stearate, and vinyl benzoate.

Examples of the functional group in the other polymerizable monomer having a carbon-carbon unsaturated double bond and as necessary, having a functional group, in one molecule, include a hydroxyl group, a carboxyl group, an isocyano group and an epoxy group.

For example, examples of the monomer having a hydroxyl group include vinyl alcohol, 2-hydroxyethyl(meth)acrylate, 1-hydroxypropyl(meth)acrylate, 2-hydroxypropyl(meth)acrylate, 4-hydroxybutyl(meth)acrylate, polyethylene glycol mono(meth)acrylate, polypropylene glycol mono(meth)acrylate, hydroxystyrene, and N-methylolacrylamide.

Examples of the monomer having a carboxyl group include (meth)acrylic acid, itaconic acid, isovaleric acid, maleic acid, fumaric acid, and derivatives thereof. Examples of the derivatives include (meth)acrylonitrile, (meth)acrylic acid salts, alkyl (meth)acrylates such as methyl(meth)acrylate, butyl (meth)acrylate, ethylhexyl(meth)acrylate and stearyl (meth) acrylate, and benzyl(meth)acrylate.

Examples of the monomer having an isocyano group include (meth)acryloyloxyethyl isocyanate and (meth)acryloyloxypropyl isocyanate, as well as the reaction products obtained by reacting a hydroxyalkyl(meth)acrylate such as 2-hydroxyethyl(meth)acrylate and 4-hydroxybutyl(meth) acrylate, with a polyisocyanate such as toluene diisocyanate or isophorone diisocyanate.

Examples of the monomer having an epoxy group include glycidylmethacrylate, glycidylcinnamate, glycidyl allyl ether, glycidyl vinyl ether, vinylcyclohexane monoepoxide, and 1,3-butadiene monoepoxide.

In the present invention, one or two or more kinds of the monomer compounds mentioned above can be appropriately selected and used in accordance with the various performances requested of the ink composition. A preferred embodiment of the binder resin according to the present invention may be a combination of a vinyl chloride/vinyl acetate copolymer and a urethane resin.

The production of the vinyl-based copolymer used in the present invention is not particularly limited, and can be carried out by applying a conventionally known method. For example, a so-called suspension polymerization method can be applied, in which water, a dispersant and a polymerization initiator are introduced into a polymerization vessel, the mixture is degassed, subsequently a portion of a vinyl chloride monomer and a fatty acid vinyl monomer are pressure-fed into the polymerization vessel to initiate the reaction, and then a polymerization reaction is carried out while the remaining portion of the vinyl chloride monomer is pressure-fed into the polymerization vessel during the reaction. The vinyl copolymer thus obtained is also available as commercially marketed product. For example, according to the present invention, "NISSIN VINYL" (trade name) manufactured by Nissin Chemical Industry Co., Ltd., can be used as the vinyl chloride/vinyl acetate copolymer.

The polymerization initiator used in the production of the vinyl-based copolymer may be a peroxide or azo compound that is representative in the pertinent technical field. For example, benzoyl peroxide, azoisobutylvaleronitrile, azobisisobutyronitrile, di-t-butyl peroxide, t-butylperbenzoate, t-butylperoctoate, cumenehydroxyperoxide, or the like can be used. The polymerization temperature is 50 to 140° C., and preferably 70 to 140° C. A preferred number average molecular weight of the obtained vinyl-based copolymer is 5,000 to 100,000.

At the time of the polymerization as described above, for example, a non-aromatic solvent is used. Examples of the solvent that can be used in the present invention include ketones such as acetone, methyl ethyl ketone, methyl isobutyl ketone, and cyclohexanone; ethers such as tetrahydrofuran, dioxane, ethylene glycol dimethyl ether, and diethylene glycol dimethyl ether; and esters such as ethyl acetate and butyl acetate. The solvent may also be used as mixtures of two or more kinds.

According to the present invention, in the case of using a urethane resin and a vinyl-based copolymer in combination as a binder resin, the content ratio of the urethane resin and the vinyl-based copolymer is preferably in the range of 95:5 to 5:95. Furthermore, from the viewpoint of the adhesiveness to the base paper, anti-blocking property, dispersibility of ink, abrasion resistance, and ink adaptability upon foaming, the content ratio is more preferably in the range of 50:50 to 90:10.

Furthermore, the total content of the binder resin relative to the total weight of the brightening ink composition of the present invention is preferably adjusted to 30% by weight or less, and more preferably adjusted in the range of 5 to 25% by weight. When the amount of use of the binder resin is adjusted within the range mentioned above, it is easy to obtain an appropriate ink viscosity, and the operation efficiency at the time of ink production and printing can be increased.

Specific examples of the solvent used in the ink composition of the present invention mainly include alcohol-based organic solvents such as methanol, ethanol, n-propanol, isopropanol and butanol; ketone-based organic solvents such as acetone, methyl ethyl ketone and methyl isobutyl ketone; ester-based organic solvents such as methyl acetate, ethyl acetate, propyl acetate and butyl acetate; aliphatic hydrocarbon-based organic solvents such as n-hexane, n-heptane and n-octane; and alicyclic hydrocarbon-based organic solvents such as cyclohexane, methylcyclohexane, ethylcyclohexane, cycloheptane, and cyclooctane. When the solubility of the binder resin and dryability are considered, it is preferable to use the various solvents mentioned above in a mixture. These organic solvents are incorporated at a proportion of 30% by weight or more in conventional ink compositions. As such, in the present invention, a non-aromatic solvent can be used to constitute an ink composition, and therefore, deterioration of the environment at the time of printing can be prevented.

The brightening ink composition of the present invention may contain a colorant as necessary. The colorant used in the present invention may be an inorganic pigment or an organic pigment generally used in printing inks or coating materials. Examples thereof include inorganic pigments such as titanium oxide and carbon black; and organic pigments such as soluble azo pigments, insoluble azo pigments, azo chelate pigments, condensed azo pigment, copper phthalocyanine pigments and condensed polycyclic pigments. By adding a colorant to the brightening ink composition containing various components previously described, various senses of brightness can be imparted, and the design applicability and aesthetic properties of printing can be further increased.

The brightening ink composition of the present invention may contains various hard resins as necessary. Examples of the hard resin include a dimer acid-based resin, a maleic acid-based resin, a petroleum resin, a terpene resin, a ketone resin, a dammar resin, a copal resin, and chlorinated polypropylene. When a hard resin is added into the brightening ink composition, an effect of enhancing the adhesiveness of the ink film to the base material can be expected. Therefore, it is effective in an instance where a printed layer is formed on a plastic film which has not be surface treated.

The brightening ink composition of the present invention can contain a crosslinking agent or a wax component for the purpose of enhancing heat resistance, oil resistance or abrasion resistance, as necessary.

Examples of the crosslinking agent include alkyl titanate-based and isocyanate-based crosslinking agents. More specific examples include, as alkyltitanate-based crosslinking agents, tetraisopropoxytitanium, tetra-n-butoxytitanium, tetrakis(2-ethylhexyloxy)titanium, tetrastearyloxytitanium, tri-isopropoxytitanium monostearate, tri-n-butoxytitanium monostearate, diisopropoxytitanium distearate, and di-n-butoxytitanium distearate; and as isocyanate-based crosslinking agents, aliphatic polyisocyanate compounds, alicyclic polyisocyanate compounds, aromatic aliphatic polyisocyanate compounds, aromatic polyisocyanates, and various Biuret compounds and isocyanarate compounds. Among these, from the viewpoint of heat resistance, alkoxytitanium stearate-based compounds are more suitable, and from the viewpoint of increasing the adhesiveness to films, isocyanate-based crosslinking agents and the like are also effective.

On the other hand, as the wax, various known waxes such as polyolefin waxes and paraffin waxes can be used.

Furthermore, the ink composition of the present invention may be incorporated with various additives for ink, such as a pigment dispersant, a leveling agent, a surfactant and a plasticizer, as necessary.

The brightening ink composition of the present invention can be produced by mixing the various components mentioned above by applying a widely known technology. More specifically, a method may be mentioned in which first, a brightening material, a binder resin, an organic solvent, and according to necessity, a pigment dispersant, a surfactant and the like are mixed under stirring, subsequently the mixture is kneaded using various kneading machines such as, for example, a bead mill, a ball mill, a sand mill, an attriter, a roll mill, and a pearl mill, and other remaining materials are further added and mixed.

(Heat Insulating Foamed Paper Container Material)

The heat insulating foamed paper container material according to the present invention is a material for producing heat insulating foamed paper containers, and is characterized in that the material is constituted by using the brightening ink composition according to the present invention explained above. More specifically, the heat insulating foamed paper container material (hereinafter, simply referred to as "paper container material") of the present invention includes, as shown in FIG. 1, a base paper 10; a first thermoplastic synthetic resin film 20 that covers one surface of the base paper 10; a second thermoplastic synthetic resin film 30 that covers the other surface of the base paper, has a lower melting point than the first thermoplastic synthetic resin film, and is foamed by a heat treatment to form a heat insulating layer; and a printed layer 40 provided on at least a part of the surface of the film 30, and the material is characterized in that the printed layer 40 contains at least one print pattern 42 that is formed from the ink composition according to the present invention.

The base paper used for producing the paper container material of the present invention is not particularly limited. However, from the viewpoint of the container weight, a base paper having a basis weight in the range of 80 g/m² to 400 g/m² is preferred. It is also preferable that this base paper have a water content in the range of about 5 to 10% by weight, from the viewpoint of foamability at the time of the production of containers.

The first thermoplastic synthetic resin film (high-Mp resin film) and the second thermoplastic synthetic resin film (low-Mp resin film) that are laminated on the base paper, may be films formed from a resin material which is conventionally well known as a container material. For example, the film can be appropriately selected for use from films formed from stretched and unstretched polyolefins such as polyethylene and polypropylene, and thermoplastic synthetic resins such as polyester, nylon, cellophane and vinylon. However, when a container is produced from the container material of the present invention described above, the container material is used such that the low-Mp resin film constitutes the outer wall surface of the container body. Therefore, the melting point of the low-Mp resin film must be lower than the melting point of the high-Mp resin film that forms the inner wall surface of the container body. For example, as previously explained with regard to the related art technologies, a high melting point polyethylene film having a melting point of about 130° C. to 135° C. can be used as the first thermoplastic synthetic resin film. Furthermore, a low melting point polyethylene film having a melting point of about 105° C. to 110° C. can be used as the low-Mp resin film.

However, the respective thermoplastic synthetic resin films that can be used in the present invention are not intended to be limited to combinations of polyethylene films having different melting points, and films formed from other resin materials can be appropriately selected and used. According to the present invention, it is desirable that the high-Mp resin film do not undergo melting or softening when the low-Mp resin film is foamed by a heat treatment. That is, the indications of high melting point and low melting point are described from a relative point of view, and are not intended to be limited by the specific melting points of the respective resin films. However, since those heat insulating foamed paper containers holding foods such as cup noodles are usually subjected to pouring of boiling water, the melting point of the resin film used as the low-Mp resin film must be 100° C. or higher.

For example, when the inner wall surface of the body and the outer wall surface of the body of the container are respectively constituted of a polyethylene film, one surface of the base paper (inner wall surface of the container) should be laminated with a medium-density or high-density polyethylene film, while the other surface (outer wall surface of the container) should be laminated with a low-density polyethylene film. The thickness of the respective films to be laminated on the base paper is not particularly limited. However, it is preferable that the thickness of the low-Mp resin film that constitutes the outer wall surface of the container body, be appropriately set up so as to be a thickness sufficient for the film layer after foaming to function as a heat insulating layer when the film is foamed.

For example, when the outer wall surface of the container body is constituted of a low-density polyethylene film, the thickness of the film to be laminated on the base paper may be 25 to 80 μm. On the other hand, when the inner wall surface of the container body is constituted of a medium-density or high-density polyethylene film, the thickness of the film to be laminated on the base paper is not particularly limited. However, it is preferable to set up the thickness of the film appropriately so as to secure the resistance to the penetration of the content when the container material is made into a heat insulating foamed paper container. Since the thickness of the films to be laminated on the base paper varies with the resin material of the used film, it is desirable for an ordinarily skilled person in the art to appropriately set up the thickness, while taking the properties of the resin material into consideration.

The printed layer in the paper container material constituted as explained above is formed by using the brightening ink composition according to the present invention, and performing surface printing gravure printing on the low-Mp resin film that constitutes the outer wall surface of the container. The constitution of the printed layer is not particularly limited, and any well known technology may be applied. FIG. 1 is a schematic cross-sectional view showing an embodiment of the paper container material. In the embodiment shown in FIG. 1, the printed layer 40 contains, on the low-Mp resin film 30, a print pattern 42 such as a decorative pattern, formed from the brightening ink composition of the present invention.

Figure 2:
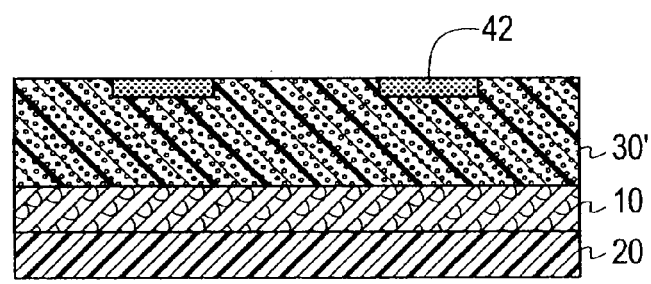
FIG. 2 is a schematic cross-sectional view showing the condition of the paper container material shown in FIG. 1 after a heat treatment.

Conventionally, when a printed layer such as shown in FIG. 1 is formed on the low-Mp resin film using a colored ink, there is a tendency that the printed layer inhibits the foaming of the low-Mp resin film, so that the thickness of the film after foaming is not uniform and the printed areas are depressed, and thereby a significant difference in level with the non-printed areas occurs. However, according to the present invention, the occurrence of depression on the printed surface after the foaming of the low-Mp resin film can be effectively suppressed. FIG. 2 is a schematic cross-sectional view showing the condition of the paper container material of the present invention shown in FIG. 1 after being foamed by a heat treatment. As shown in FIG. 2, according to the present invention, the printed layer has excellent foaming adaptability, and therefore, the thickness of the low-Mp resin film foamed by a heat treatment (heat insulating layer 30') becomes uniform. Thereby, the surface of the printed layer 40 becomes uniform with the foamed surface of the film in the non-printed areas, and thus the occurrence of surface unevenness is suppressed.

Figure 3:
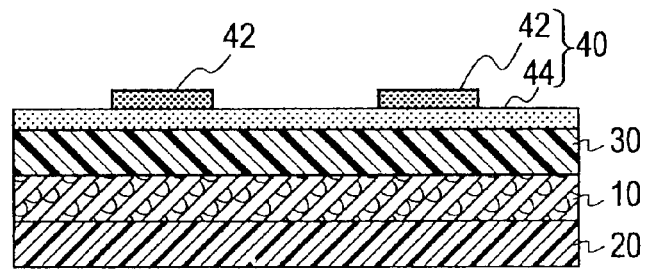
FIG. 3 is a schematic cross-sectional view showing an embodiment of the paper container material according to the present invention.

FIG. 3 is a schematic cross-sectional view showing another embodiment of the paper container material according to the present invention. The printed layer 40 of the paper container material shown in FIG. 3 is constituted from an undercoat layer 44 formed on the low-Mp resin film 30, and a print pattern 42 formed on the undercoat layer 44. The formation of such a printed layer can be carried out by, for example, first printing a white ink over the entire surface of the film 30, and then printing a pattern with a brightening ink. In the paper container material having such a constitution, when the print pattern is formed using a conventional brightening ink, the printed areas of the brightening ink are still depressed even though an undercoat layer of the white ink has been provided, and a difference in level is prone to occur at the printed surface. However, according to the present invention, when the print pattern of the printed layer is formed using a specific brightening ink, the ink film does not significantly inhibit the foaming of the low-Mp resin film. Therefore, the heat insulating layer formed as a result of foaming of the low-Mp resin film by a heat treatment, obtains a uniform thickness, and a printed surface having less surface unevenness is easily obtained.

Figure 4:
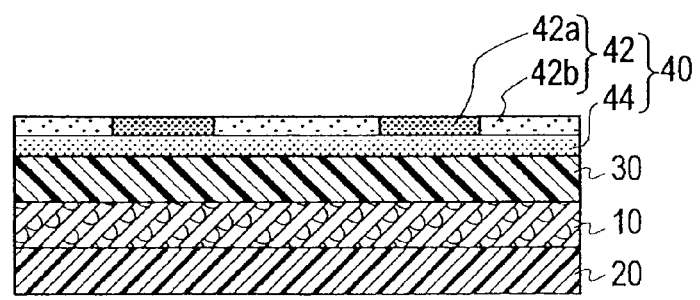
FIG. 4 is a schematic cross-sectional view showing an embodiment of the paper container material according to the present invention.

FIG. 4 is a schematic cross-sectional view showing another embodiment of the paper container material according to the present invention. The printed layer of the paper container material shown in FIG. 4 is constituted from an undercoat layer 44 formed on the film 30, and a pattern 42 consisting of a first print section 42a and a second print section 42b formed on the undercoat layer 44. The formation of such a printed layer is carried out such that, initially, a first layer is printed as an undercoat layer 44 using a white ink over the entire surface of the film. Subsequently, a second layer is pattern-wise printed using the white ink to form a first print section 42a, and then printing is performed using a brightening ink in the non-printed areas other than the first print section 42a of the second layer formed by the white ink, to form a second print section 42b. As such, there can be formed a printed layer having a two-layer constitution (white/white and white/brightening ink) in which the print pattern 42 consisting of the first and second print sections 42a and 42b, can be formed on the undercoat layer 44. The order of printing with the white ink and brightening ink that form the first and second print patterns at the second layer, is not particularly limited.

The paper container material of the present invention having a constitution such as shown in FIG. 4 is preferable in the aspect that as previously explained in connection with FIG. 3, a printed surface with less surface unevenness is easily obtained, and that since the thickness of the printed layer formed on the low-Hp resin film is constant, obtaining a printed surface having less surface unevenness is more easily achieved even after the foaming of the low-Mp resin film by a heat treatment.

In the present invention, when an overprinting printed layer such as shown in FIGS. 3 and 4 is formed, the white ink used for forming the undercoat layer or the like is not particularly limited. However, it is preferable that the white ink have a composition that does not significantly inhibit the foaming of the low-Mp resin film. According to one embodiment of the present invention, the white ink contains a binder resin, a white pigment and a solvent. From the viewpoint of concealability and light fastness, it is preferable to use titanium dioxide as the white pigment. Furthermore, the binder resin and the solvent can be selected from the binder resins and solvents previously exemplified as the constituent components of the brightening ink composition of the present invention. In an embodiment of the present invention, it is preferable to use a urethane resin and a vinyl-based copolymer in combination as the binder resin in the white ink, and among the urethane resins, it is more preferable to use a urethane-urea resin. The mixing ratio (solids content) of the urethane resin/vinyl-based copolymer is not particularly limited, but a mixing ratio of 90/10 maybe mentioned as a preferable embodiment. The content (solids content) of the binder resin in the white ink is preferably adjusted to 30% by weight or less relative to the total weight of the ink.

Printing of the ink composition for forming a printed layer in the present invention is not particularly limited, and any well known technology may be applied. For example, in the case of performing printing using a white ink or the like over the entire surface of the film so as to form an undercoat layer, a coater such as a bar coater, a roll coater or a reverse roll coater may be used.

(Heat Insulating Foamed Paper Container)

The heat insulating foamed paper container according to the present invention is constituted from a container body member and a bottom plate member, and is characterized in that the container body member is formed from the paper container material according to the present invention. More specifically, the heat insulating foamed paper container of the present invention has, as shown in FIG. 5, a container body 50 formed from the paper container material of the present invention, and is obtained by joining the container body with a bottom plate 60 such that the high-Mp resin film in the paper container material forms the inner wall surface 50a of the container and the printed layer on the low-Mp resin film forms the outer wall surface 50b of the container, thereby forming a container, and foaming the low-Mp resin film by heat treating the container.

The processing of forming the heat insulating foamed paper container of the present invention can be carried out by applying a well known technology. For example, firstly, a container body member obtained by punching the heat insulating foamed paper container material of the preset invention along a frame into a predetermined shape, and a bottom plate member obtained by punching a bottom plate material in the same manner into a predetermined shape, are assembled into a container shape using a conventional container manufacturing apparatus, and thus a container is formed. The formation of a container by assembling using a container manufacturing apparatus is carried out such that the high-Mp resin film of the container body member forms the inner wall surface, while the low-Mp resin film forms the outer wall surface, and the laminated surface of the bottom plate member comes to the inner side. After a container is formed by assembling by a container manufacturing apparatus as the above, when the container is subjected to a heat treatment, the low-Mp resin film is foamed and thereby forms a heat insulating layer, and thus a heat insulating foamed paper container is obtained.

The heating temperature or heating time in the heat treatment for forming a heat insulating layer, vary depending on the properties of the base paper or thermoplastic synthetic resin films used. A person having ordinary skill in the art can appropriately select and determine the combination conditions for the heating temperature and heating time that are optimal for the films used. In general, the heat treatment carried out in the container forming process involves, but not intended to be limited to, a heating temperature of about 100° C. to about 200° C., and a heating time of about 20 seconds to about 10 minutes. In the case of using a low-density polyethylene (thickness 70 μm), the heating temperature is preferably 100° C. to 130° C., and the heating time is preferably about 5 minutes to 6 minutes. As a heating means, any means such as hot air, electrical heating and electron beams can be used. When heating is performed using hot air, electrical heating or the like within a tunnel equipped with a conveying means using a conveyor, it is possible to produce large quantities of heat insulating foamed paper cups at low cost.

Figure 5:
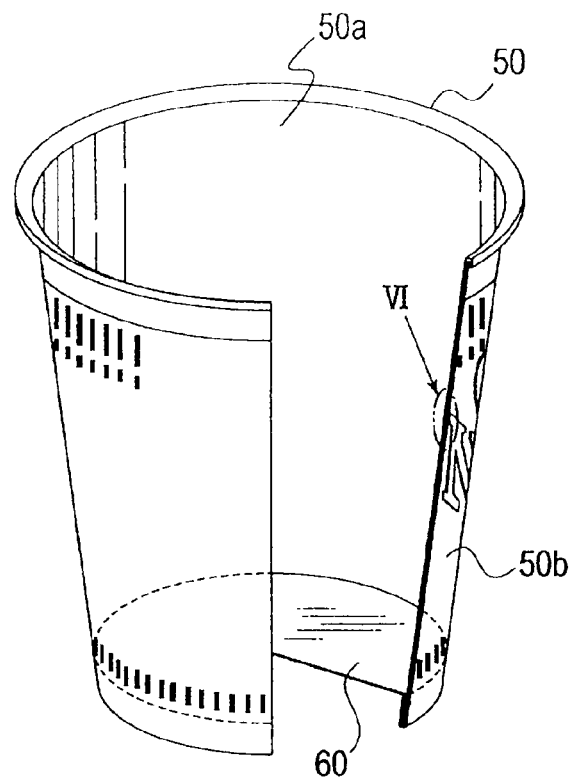
FIG. 5 is a perspective view showing an embodiment of the heat insulating foamed paper container according to the present invention.
Figure 6:
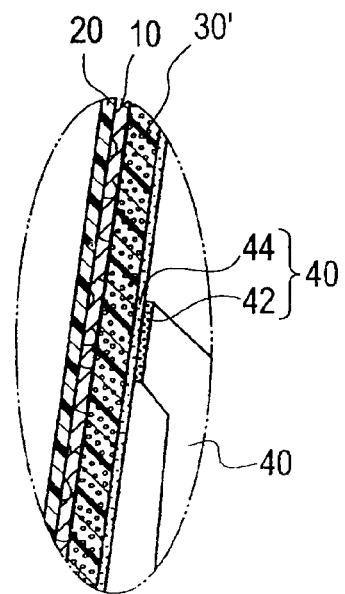
FIG. 6 is a schematic cross-sectional view showing a magnified view of the section VI of the heat insulating foamed paper container shown in FIG. 5.

FIG. 5 is a perspective view showing the structure of a heat insulating foamed paper container obtained by carrying out a heat treatment after the assembling and forming of the container. In the figure, reference numeral 50 refers to the container body, and reference numeral 60 refers to the bottom plate. FIG. 6 is a schematic cross-sectional view showing a magnified view of the reference numeral VI section of the container body of the heat insulating foamed paper container shown in FIG. 5. The container body is composed of, in the order from the outer wall surface 50b of the container, a printed layer 40, a heat insulating layer 30' formed from a low-Mp resin film, a base paper 10, and a high-Mp resin film 20 forming the inner wall surface of the container. In addition, the layer constitution of the container body member of the container shown in FIG. 6 is equivalent to the structure obtained by foaming the paper container material shown in FIG. 3.

As it can be seen from FIG. 6, the printed layer 40 that forms the container surface shown in FIG. 5 is composed of an undercoat layer 44 that is provided over the entire surface of the heat insulating layer 30' and formed from a white ink, and a print pattern 42 that is formed thereon and formed from a brightening ink. As such, according to the present invention, since the printed layer 40 forming the outer wall surface of the container body is constituted from an ink composition having excellent foaming adaptability, the printed layer (Reference Numeral 40 in FIG. 3) on the low-Mp resin film (Reference Numeral 30 in FIG. 3) does not inhibit the foaming of the film, and the low-Mp resin film forms a uniform heat insulating layer 30' by a heat treatment. Furthermore, in the foaming of the low-Mp resin film, since the printed layer has excellent foaming adaptability, the occurrence of surface unevenness on the container surface is suppressed, and the occurrence of cracks in the ink film is suppressed. As discussed above, when the ink composition according to the present invention is applied to construct a heat insulating foamed container, it is made possible to realize a smooth container surface having excellent heat insulating properties.

EXAMPLES

Hereinafter, the present invention will be more specifically explained by way of Examples, but the present invention is not intended to be limited to those Examples. Unless particularly stated otherwise, the "parts" and "%" in the present Examples indicate "parts by weight" and "% by weight", respectively.

Preparation Example 1

Preparation of Polyurethane Resin Varnish 313 parts of a polypropylene glycol having a number average molecular weight of 2,000, 63 parts of isophorone diisocyanate, and 60 parts of ethyl acetate were fed into a four-necked flask equipped with a stirrer, a thermometer, a reflux cooler and a nitrogen gas inlet tube, and the mixture was allowed to react for 6 hours at 90° C. under a nitrogen gas stream. Thus, a prepolymer was obtained. Subsequently, this prepolymer was added dropwise into a mixture of 21 parts of isophorone diamine, 360 parts of ethyl acetate, and 180 parts of isopropyl alcohol, and the chain length was extended. Thereby, a polyurethane resin varnish (PU varnish) was obtained. This polyurethane resin varnish (PU varnish) had a solids content of 40%, a viscosity at 25° C. of 200 mPa·s, and a weight average molecular weight of 9,000. The measurement of the molecular weight was carried out using SHODEX DS-4 (manufactured by Showa Denko K.K.) equipped with a UV detector and a refractometer.

Preparation Example 2

Preparation of Vinyl Chloride-Vinyl Acetate Copolymer Varnish 25 parts of a vinyl chloride-vinyl acetate copolymer (SOLBINTA5R, manufactured by Nissin Chemical Industry Co, Ltd.) was mixed and dissolved in 75 parts of ethyl acetate, and thus a solution of a vinyl chloride-vinyl acetate copolymer varnish for a test (PVC-PVAc varnish) was obtained.

Example 1

1. Preparation of Brightening Ink 45 parts of the polyurethane resin varnish obtained in the Preparation Example 1, 8 parts of the vinyl chloride-vinyl acetate copolymer varnish (PVC-PVAc varnish) obtained in the Preparation Example 2, 15 parts of a non-leafing aluminum paste (ALPASTE 1100TA manufactured by Toyo Aluminum K.K.; solids content 65%, particle size 12 µm), 2.5 parts of untreated silica (SYLYSIA 450 manufactured by Fuji Silysia Chemical, Ltd.; particle size 5.2 µm), and 29.5 parts of a mixed solvent containing methylcyclohexane:isopropyl alcohol:ethyl acetate=40:40:20 (weight ratio) were blended, and then the mixture was stirred over 20 minutes with a disper. Thus, a brightening ink was obtained.

2. Preparation of White Ink 12 parts of the polyurethane resin varnish obtained in the Preparation Example 1, 19.2 parts of the vinyl chloride-vinyl acetate copolymer varnish (PVC-PVAc varnish) obtained in the Preparation Example 2, 40 parts of titanium oxide (TITANIX JR 800 (manufactured by Teika K.K.)), and 28.8 parts of a mixed solvent containing methylcyclohexane:isopropyl alcohol:ethyl acetate=40:40:20 (weight ratio) were blended, and then the mixture was dispersed and kneaded with a sand mill. Thus, a white ink for the undercoat was obtained.

3. Formation of Printed Layer

A paper container material having a high melting point polyethylene film (melting point 133° C.) laminated in advance on one surface of a base paper and having a low melting point polyethylene film (melting point 106° C.) laminated on the other surface of the base paper, was provided, and on the low melting point film of the material, a printed layer of white ink/brightening ink overprinting having a printed layer constitution such as shown in FIG. 3 was formed with a gravure proof press, using the white ink and the brightening ink previously prepared.

4. Evaluation

Firstly, the paper container material having a printed layer formed as described above, was evaluated on the adhesiveness, heat resistance and abrasion resistance of the printed Layer, according to the following evaluation methods. The results are presented in Table 1.
(Evaluation of Adhesiveness)
CELLOTAPE (registered trademark) was adhered to the printed surface of the paper container material and was pressed five times with fingers, and then the tape was peeled off. The adhesiveness to the base paper was evaluated on the basis of a comparison between the area of the region adhered with the tape and the area of the region from which the ink film was peeled off from the base paper (on the laminate layer).
A: The ink film did not peel off at all.
B: The area of the region from which the ink film was peeled from the base paper or the white ink composition, is 20 to 50% of the area of the region adhered with the tape.
C: The area of the region from which the ink film was peeled from the base paper or the white ink composition, is greater than 50% of the area of the region adhered with the tape.
(Evaluation of Heat Resistance)
An aluminum foil piece cut to the same size as the printed matter was superposed on the printed surface, and the aluminum foil was pressed for 1 second with a pressure of 2 kg/cm$^2$ using a heat seal tester. The heat resistance was evaluated from the minimum temperature at which the brightening ink was transferred to the aluminum foil.

A: The minimum temperature was 160° C. or higher.
B: The minimum temperature was 140° C. or higher and lower than 160° C.
C: The minimum temperature was lower than 140° C.
(Abrasion Resistance)

The top of the brightening ink printed surface was rubbed with a high-quality paper under a load of 2.5 N/cm² using a Gakushin-type abrasion resistance tester, and the abrasion resistance was evaluated from the number of rubbings required to remove 20% or more of the entirety of the printed surface.
A: 100 times or more.
B: 50 times or more and fewer than 100 times.
C: Fewer than 50 times.

Subsequently, the paper container material having a printed layer formed thereon is heat treated for 5 minutes at 120° C. to foam the low melting point film, and then evaluation of the foaming adaptability of the printed layer and the external appearance of foaming, and a sensory odor test were carried out according to the methods shown below. The results are presented in Table 2.
(Evaluation of Foaming Adaptability)

For the surface of the printed layer obtained after foaming of the low melting point film, the difference in level of the white ink print sections and the brightening ink print sections was felt by touching, and the degree of depression of the brightening ink print sections was evaluated according to the following criteria.
A: The difference in level with the white ink print sections was hardly perceived.
B: The difference in level with the white ink print sections was perceived to some extent.
C: The difference in level with the white ink print sections was perceived fairly significantly.
(Evaluation of External Appearance of Foaming)

The state of external appearance of the brightening ink printed surface obtained after the foaming of the low melting point film was visually observed, and the degree of occurrence of ink splits (cracks) was evaluated from the a real proportion of the crack portion occupying the entire printed surface.
A: There are no ink splits.
B: The total area of ink splits occupies 50% of the printed surface.
D: The total area of ink splits occupies 80% or more of the printed surface.
(Sensory Odor Test)

A brightening ink printed matter having a size of 0.2 m² obtained after foaming of the low melting point film was fed into a 500-ml conical flask, and the flask was sealed. Thus, a sensory odor sample was produced. The sample was left to stand for 10 days under the exposure to sunlight and then the odor in the flask was subjected to a sensory evaluation. The evaluation results are presented in Table 1.
A: The odor in the flask is not perceived.
B: The odor in the flask is slightly perceived.
C: The odor in the flaks is strongly perceived.

Examples 2 to 19 and Comparative Examples 1 to 4

The various components as shown in Tables 1 to 3 were blended, and brightening inks were prepared according to the same stirring method and preparation procedure as used in Example 1. Subsequently, each of the brightening inks was used to form a printed layer on the low melting point film of the paper container material according to the same method as used in Example 1. The formation of the undercoat layer was carried out by using the same white ink as that used in Example 1.

In the Tables 1 to 3, the details of the brightening materials used in Examples 2 to 19 and Comparative Examples 1 to 4 are as follows.

Leafing aluminum paste: ALUTOP 18TH (manufactured by Asahi Kasei Chemicals Corp., solids content 80%, particle size 7 μm)

Non-leafing aluminum paste (ALPASTE 1100TA manufactured by Toyo Aluminum K.K., solids content 65%, particle size 12 μm)

Aluminum flakes: METASHEEN KM100 (manufactured by Toyo Aluminum K.K., particle size 12 μm)

Pearl pigment: IRIODIN120BS (manufactured by Merck Japan, Ltd., particle size 5 to 25 μm)

Treated silica: SYLOPHOBIC 200 (Fuji Silysia Chemical, Ltd., particle size 3.9 μm)

Untreated silica (SYLYSIA450 manufactured by Fuji Silysia Chemical, Ltd., particle size 5.2 μm)

Subsequently, the paper container materials having an overprint printed layer produced in Examples 2 to 19 and Comparative Examples 1 to 4 were used to evaluate the adhesiveness, heat resistance and abrasion resistance of each of the printed layers in the same manner as in Example 1. Furthermore, the paper container materials having a printed layer were heat treated for 5 minutes at 120° C. to foam the low melting point film, and then evaluations of the foaming adaptability of the printed layer and the external appearance of foaming, and a sensory odor test were carried out in the same manner as in Example 1. These evaluation results are presented in Tables 1 to 3.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Ink composition | Brightening material | Non-leafing aluminum paste NV65% | Leafing aluminum paste NV80% | Aluminum flakes | Pearl pigment | | Non-leafing aluminum paste NV65% | | | | | |
| | | 15 | 7 | 30 | 20 | 15 | 15 | 15 | 15 | 15 | 15 | 15 |
| | Untreated silica | 2.5 | 2.5 | 2.5 | 2.5 | | 2.5 | 2.5 | 2.5 | 2.5 | 2.5 | 2.5 |
| | Treated silica | | | | | 2.5 | | | | | | |
| | PU varnish | 45 | 45 | 45 | 45 | 45 | 35 | 25 | 15 | 5 | 50 | 0 |
| | Vinyl chloride acetate resin varnish | 8 | 8 | 8 | 8 | 8 | 24 | 40 | 56 | 72 | 0 | 80 |

TABLE 1-continued

|  |  | Example | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
|  | Mixed solvent | 29.5 | 37.5 | 14.5 | 24.5 | 29.5 | 23.5 | 17.5 | 11.5 | 5.5 | 32.5 | 2.5 |
|  | (Total) | 100 | 100 | 100 | 100 | 100 | 100 | 100 | 100 | 100 | 100 | 100 |
|  | Urethane/vinyl chloride acetate (solids content) | 9/1 | 9/1 | 9/1 | 9/1 | 9/1 | 7/3 | 5/5 | 3/7 | 1/9 | 10/0 | 0/10 |
| Evaluation item | Foaming adaptability | A | A | A | A-B | A-B | A | A | A | A-B | A | B |
|  | External appearance of foaming | A | A | A | A | A | A | A | A | A | B | A |
|  | Odor | A | A | A | A | A | A | A | A | A | A | A |
|  | Abrasion resistance | A | A-B | A | A | A | A | A | A | A | A-B | A |
|  | Adhesiveness | A | A-B | A | A | A | A | A | A-B | A-B | A | B |
|  | Heat resistance | A | A | A | A | A | A | A | A | A | A-B | A |

TABLE 2

|  |  | Example | | | | | | | |
|---|---|---|---|---|---|---|---|---|---|
|  |  | 12 | 13 | 14 | 15 | 16 | 17 | 18 | 19 |
| Ink composition | Brightening material | Non-leafing aluminum paste NV65% | | | | | | | |
|  |  | 45 | 4 | 8 | 31 | 15 | 15 | 15 | 15 |
|  | Untreated silica | 2.5 | 2.5 | 2.5 | 2.5 | 1 | 3.5 | 0.2 | 5 |
|  | PU varnish | 37.5 | 45 | 45 | 45 | 45 | 45 | 45 | 45 |
|  | Vinyl chloride acetate resin varnish | 7 | 8 | 8 | 8 | 8 | 8 | 8 | 8 |
|  | PA varnish |  |  |  |  |  |  |  |  |
|  | NC varnish |  |  |  |  |  |  |  |  |
|  | Mixed solvent | 8 | 40.5 | 36.5 | 13.5 | 31.0 | 28.5 | 31.8 | 27.0 |
|  | (Total) | 100 | 100 | 100 | 100 | 100 | 100 | 100 | 100 |
|  | Urethane/vinyl chloride acetate (solids content) | 9/1 | 9/1 | 9/1 | 9/1 | 9/1 | 9/1 | 9/1 | 9/1 |
| Evaluation item | Foaming adaptability | A-B | A-B | A | A | A | A | B | A |
|  | External appearance of foaming | A | A | A | A | A | A | A | A |
|  | Odor | A | A | A | A | A | A | A | A |
|  | Abrasion resistance | A | A | A | A | A | A | A | A-B |
|  | Adhesiveness | A | A | A | A | A | A | A | A |
|  | Heat resistance | A | A | A | A | A | A | A | A |

TABLE 3

|  |  | Comparative Example | | | |
|---|---|---|---|---|---|
|  |  | 1 | 2 | 3 | 4 |
| Ink composition | Brightening material | Non-leafing aluminum paste NV65% | Leafing aluminum paste NV80% | Aluminum flakes | Pearl pigment |
|  |  | 15 | 7 | 30 | 20 |
|  | Untreated silica |  |  |  |  |
|  | Treated silica |  |  |  |  |
|  | PU varnish | 45 | 45 | 45 | 45 |
|  | Vinyl chloride acetate resin varnish | 8 | 8 | 8 | 8 |
|  | PA varnish |  |  |  |  |
|  | NC varnish |  |  |  |  |
|  | Mixed solvent | 32.0 | 40.0 | 17.0 | 27.0 |
|  | (Total) | 100 | 100 | 100 | 100 |
|  | Urethane/vinyl chloride acetate (solids content) | 9/1 | 9/1 | 9/1 | 9/1 |
| Evaluation item | Foaming adaptability | C | C | C | C |
|  | External appearance of foaming | A | A | A | A |
|  | Odor | A | A | A | A |
|  | Abrasion resistance | A-B | A-B | A-B | A-B |
|  | Adhesiveness | A | A-B | A | A |
|  | Heat resistance | A | A | A | A |

As it is obvious from the Tables 1 to 3, the brightening ink composition of the present invention containing silicon dioxide and a brightening material such as aluminum, is such that the ink film conforms to the foaming of the low-Mp resin film without significantly inhibiting the foaming, and splits of the ink film (cracks) do not occur. Therefore, the brightening ink composition is suitable as an ink for forming a printed layer of heat insulating foamed paper containers. Furthermore, in the printed surface obtained after foaming of the low-Mp resin film, the differences in level between the brightening ink printed areas and the other printed areas were small, and almost smooth printed surfaces were obtained. Thus, the design applicability and aesthetic properties of containers can be enhanced. Moreover, since the foaming of the low-Mp resin film is not significantly inhibited by the brightening ink printed areas, a uniform heat insulating layer is formed by foaming, and excellent heat insulating properties are obtained. Containers were actually formed and processed using the paper container material according to the present invention for the container body member, and it was found that the same results were obtained. In the Comparative Examples 1 to 4, excellent results were obtained in the evaluation of the external appearance of foaming. However, in the evaluation of the foaming adaptability, obvious differences in level were felt at the printed surfaces, and results of poor foaming adaptability were obtained. That is, the results on the excellent external appearance of foaming in the Comparative Examples 1 to 4 should be interpreted to be attributable to the fact that the ink film inhibits the foaming of the low melting point film more significantly.

From the discussions given above, it is clear that a wide variety of different embodiments can be constituted without departing from the spirit and the scope of the present invention, and the present invention is intended to be restricted not by the specific embodiments described above, but only by the definitions given in the claims.

The invention claimed is:

1. A heat insulating foamed paper container obtained by:
    joining a container body member, formed from a heat insulating foamed paper container material, with a bottom plate member, such that a first thermoplastic synthetic resin film forms an inner wall surface and a second thermoplastic synthetic resin film forms an outer wall surface, thereby forming a container precursor; and
    foaming the second thermoplastic synthetic resin film by heat treating the container precursor,
    wherein the heat insulating foamed paper container material comprises:
    (i) a base paper;
    (ii) the first thermoplastic synthetic resin film that covers a first surface of the base paper;
    (iii) the second thermoplastic synthetic resin film that covers a second surface, opposite the first surface, of the base paper, which has a lower melting point than the first thermoplastic synthetic resin film; and
    (iv) a printed layer provided on at least a part of a surface of the second thermoplastic synthetic resin film,
    said printed layer comprising at least one print pattern formed from a brightening ink composition comprising:
    (a) a brightening material, which is a non-leafing aluminum paste or aluminum flake, and having a solids content ranging from 5.20% to 20.15% by weight relative to a total weight of the brightening ink composition;
    (b) 1% to 3.5% by weight of silicon dioxide having a particle size of 2 μm to 20 μm,
    relative to a total weight of the brightening ink composition;
    (c) a binder resin which is a binder component comprising a polyurethane resin and a vinyl-comprising copolymer such that a mixing ratio of the polyurethane resin:vinyl-comprising copolymer ranges from 90:10 to 50:50 in terms of solids content; and
    (d) a mixed solvent comprising at least two solvents selected from the group consisting of an alcohol, a ketone, an ester and a hydrocarbon, wherein the mixed solvent is non-aromatic solvents.

2. The container according to claim 1, wherein the brightening material (a) is a non-leafing aluminum paste.

3. The container according to claim 2, wherein the brightening material (a) is a non-leafing aluminum paste having a particle size of 5 to 40 μm that is surface treated with at least one fatty acid.

4. The container according to claim 1, wherein the brightening ink composition further comprises:
    (e) a colorant.

5. The container according to claim 1, wherein the brightening material (a) is a non-leafing aluminum paste having a particle size of 5 to 40 μm that is surface treated with at least one fatty acid.

* * * * *